(12) United States Patent
Gerstenberger

(10) Patent No.: US 6,483,604 B1
(45) Date of Patent: Nov. 19, 2002

(54) DISK-BASED IMAGE STORAGE SYSTEM AND METHOD WITH PRIORITIZED LOADING AND RETRIEVAL OPERATIONS

(75) Inventor: Jeffrey S. Gerstenberger, Rochester, NY (US)

(73) Assignee: Nex Press Solutions, Rochester, NY (US)

( * ) Notice: Subject to any disclaimer, the term of this patent is extended or adjusted under 35 U.S.C. 154(b) by 0 days.

(21) Appl. No.: 09/258,993

(22) Filed: Feb. 26, 1999

(51) Int. Cl.[7] .............................................. G06F 12/00
(52) U.S. Cl. ..................... 358/1.17; 358/1.16; 358/404; 358/444; 711/167; 710/305
(58) Field of Search ....................... 711/167; 358/1.17, 358/1.16, 404, 444; 710/306, 308, 313–315

(56) References Cited

U.S. PATENT DOCUMENTS

| | | | |
|---|---|---|---|
| 5,130,809 A | | 7/1992 | Takayanagi |
| 5,142,667 A | | 8/1992 | Dimperio et al. |
| 5,170,263 A | | 12/1992 | Hisatake |
| 5,245,446 A | * | 9/1993 | Takayanagi .................. 395/115 |
| 5,375,202 A | | 12/1994 | May et al. |
| 5,420,696 A | | 5/1995 | Wegeng et al. |
| 5,495,339 A | * | 2/1996 | Stegbauer et al. ........... 358/296 |
| 5,611,024 A | | 3/1997 | Campbell et al. |
| 5,666,494 A | * | 9/1997 | Mote, Jr. .................... 358/468 |
| 5,808,747 A | | 9/1998 | Telle |
| 5,848,226 A | | 12/1998 | Chen et al. |
| 5,864,652 A | * | 1/1999 | Murahashi .................. 395/115 |
| 5,914,788 A | * | 6/1999 | Tomia ......................... 358/468 |
| 6,128,094 A | * | 10/2000 | Smith ......................... 358/1.15 |
| 6,154,291 A | * | 11/2000 | Asai ............................ 711/167 |

OTHER PUBLICATIONS

U.S. patent application 09/133,826, filed Aug. 13, 1998 in the name of Gerstenberger, entitled: "Disk–Based Image Storage System".

* cited by examiner

*Primary Examiner*—Edward Coles
*Assistant Examiner*—Alan Rahimi

(57) ABSTRACT

A printer apparatus and method for processing image data includes a disk storage module operable to receive, store and output compressed image data, a semiconductor RAM memory device, a data decompressor operates on the compressed image data output by the RAM memory device and a controller that determines if the disk storage module is ready to operate in a write mode or in a read mode to output compressed image data from the disk storage module for transfer to the RAM memory device. The controller also determines if the disk storage module is ready to operate in both modes, and the controller is operative to provide a preference for operation of the read mode and controls the disk storage module so that compressed image data is output from the disk storage module and written into the RAM memory device.

24 Claims, 6 Drawing Sheets

DISK-BASED IMAGE STORAGE SYSTEM AND METHOD WITH PRIORITIZED LOADING AND RETRIEVAL OPERATIONS

CROSS REFERENCE TO RELATED APPLICATION

This application is related to U.S. application Ser. No. 9/133,826, filed Aug. 13, 1998, in the name of the inventor herein and entitled "Disk-Based Image Storage System."

FIELD OF THE INVENTION

The invention is directed to a method and apparatus for storing images on a mass memory device such as a disk storage module for subsequent printing on a high-speed copier or printer. More particularly, the method and apparatus are directed to controlling disk accesses for image loads and retrieves such that the disk storage is preferably available to retrieve or output images from the disk storage module whenever the images are needed for printing.

BACKGROUND OF THE INVENTION

High-speed digital copiers and printers require temporary storage for images prior to printing them. Typically, a printer apparatus will include an image storage subsystem for storing image data representing the images. This image storage subsystem serves two important purposes. First, it decouples the speed at which input images are acquired (scanned or rasterized) from the speed at which they are printed. Second, the temporary storage allows multiple copies of a document to be produced without having to re-acquire the input images; i.e., rescan the document or in the case of an input from a computer rerasterize the data from a coded form or object form used in a page description language. For high-volume printing, where multiple sets of large documents need to be produced, the temporary storage is most economically implemented using one or more disk drives or hard drives. Compressing the images before they are stored on the disks can further increase the capacity of the temporary storage.

A system using a disk memory to store images prior to printing them is disclosed in U.S. Pat. No. 5,848,226 to Chen et al. Chen et al discloses a high-speed digital printing system that can output over 100 page-size images per minute. A disk memory stores information in compressed form for output to an image out terminal (IOT) or marking engine as needed. A typical letter-sized page image at 600 dots per inch resolution may require 4 Megabytes of data to be furnished to the marking engine or IOT. Such image data may be required to be accessed from disk memory within a period of 300 milliseconds. In addition, there are other demands of storing image data in the disk memory for recording on subsequent image frames. Data input to the system may be derived from word processors or other sources of electronic image information and typically are expressed in a page description language such as HP-PCL or Postscript™ and require decomposition such as through rasterization. Image data may also be input to the system from a scanner which provides rasterized information. The decomposed or rasterized image data may then be subject to compression to reduce storage requirements and be stored in the disk memory.

Chen et al notes the problem of competition for bandwidth in submitting data to the image output terminal (IOT) and competition in retaining a usable supply of image data to be delivered to the JOT when needed.

Chen et al resolves the problem of competition for disk access by providing a priority between software entities that provide commands to an operating system. In Chen et al requests from the marking engine for image data are assigned a highest priority so that decomposed data may be taken in real time without undergoing compression or may be retrieved from the disk ahead of other prior requests that are of less priority.

A problem with the system of Chen et al is that when a lower priority request is being operated upon, the higher priority request must wait until completion of the lower priority request and thus requires a skip frame period to be introduced which can affect adversely upon productivity.

It is therefore an object of the invention to provide an improved method and apparatus having a more optimum control over disk or mass memory access to improve productivity of the marking engine.

SUMMARY OF THE INVENTION

In accordance with a first aspect of the invention, there is provided a printer apparatus comprising a marking engine subsystem for recording information on an image recording member; and an image storage subsystem for buffering image data for output to the marking engine subsystem, the image storage subsystem including (a) an input for receiving rasterized image data; (b) a data compressor that operates on the rasterized image data to compress the rasterized image data to form compressed image data; (c) a disk storage module that is operable to receive, store and output the compressed image data; (d) a semiconductor RAM memory device that stores at least one page of the compressed image data; (e) a data decompressor that operates on the compressed image data output by the RAM memory device and decompresses the compressed image data to decompressed rasterized image data form for output to the marking engine subsystem; and (f) a controller that determines if the disk storage module is ready to operate in a write mode to receive compressed image data currently being stored in the RAM memory device and determines if the disk storage module is ready to operate in a read mode to output compressed image data from the disk storage module for transfer to the RAM memory device and, if the disk storage module is ready to operate in both modes, the controller is operative to provide a preference for operation of the read mode and controls the disk storage module so that compressed image data is output from the disk storage module and written into the RAM memory device.

In accordance with another aspect of the invention, there is provided in a printer apparatus that includes a marking engine subsystem for recording information on an image recording member an image storage subsystem for buffering image data for output to the marking engine subsystem, the image storage subsystem comprising a disk storage module that is operable to receive, store and output image data; and a controller that determines if the disk storage module is ready to operate in a write mode to receive image data and determines if the disk storage module is ready to operate in a read mode to output image data from the disk storage module, and if the disk storage module is ready to operate in both modes, the controller is operative to provide a preference to the read mode and image data is output from the disk storage for subsequent output to the marking engine subsystem; and wherein the controller controls operation of the write mode so that transfers of image data to the disk storage module are limited to no more than a portion of the image data of a page before permitting operation of the read mode.

In accordance with yet another aspect of the invention, there is provided a method of managing movement and storage of image data to and from a mass memory device in a printer apparatus, the method comprising determining if the mass memory device is ready to operate in a write mode to receive image data; determining if the mass memory device is ready to operate in a read mode to output image data stored in the mass memory device; and if the mass memory device is ready to operate in both modes: a) providing preference for operation in the read mode, and b) outputting from the mass memory device image data stored in the mass memory device; and c) controlling an operation of the write mode so that transfers of image data to the mass memory device are limited to no more than a portion of the image data of a page.

In accordance with still another aspect of the invention, there is provided a method of managing movement of image data in a printer apparatus comprising (a) inputting rasterized image data to an image storage subsystem of the apparatus; (b) compressing the rasterized image data to compress the rasterized image data to form compressed image data; (c) storing at least one page of the compressed data in a semiconductor RAM memory device; (d) outputting the compressed data from the RAM memory device to a disk storage module; (e) outputting the compressed image data from the disk storage module to the RAM memory device; (f) outputting the compressed image data from the RAM memory device that was previously stored in the disk storage device to a data decompressor; (g) decompressing the compressed image data to decompressed rasterized image data form; and (h) determining if the disk storage module is ready to operate in a write mode to receive transfers of compressed image data currently being stored in the RAM memory device and determining if the disk storage module is ready to operate in a read mode to output compressed image data from the disk storage module for transfer to the RAM memory device and, if the disk storage module is ready to operate in both modes, preference is provided for operation in the read mode and compressed image data is output from the disk storage module and written into the RAM memory device.

In accordance with still another aspect of the invention, there is provided a method of managing movement and storage of image data to and from a mass memory device in a printer apparatus, the method comprising determining when a next retrieval request is expected for transferring image data from the mass memory device in a read mode; and controlling transfers of image data to the disk storage module so that in a write mode, the transfers are limited to no more than a portion of the image data of a page and the amount of image data transferred in the write mode is related to time remaining until the next expected retrieval request.

BRIEF DESCRIPTION OF THE DRAWINGS

The advantages and benefits of this invention will become more apparent when considered in view of the following detailed description and drawings in which:

FIG. 6b is a continuation of the flowchart of FIG. 6a.

DESCRIPTION OF THE PREFERRED EMBODIMENT

Because apparatus of the type described herein are well known, the present description will be directed in particular to subject matter forming part of, or cooperating more directly with, the present invention.

General System Architecture

Figure 1:
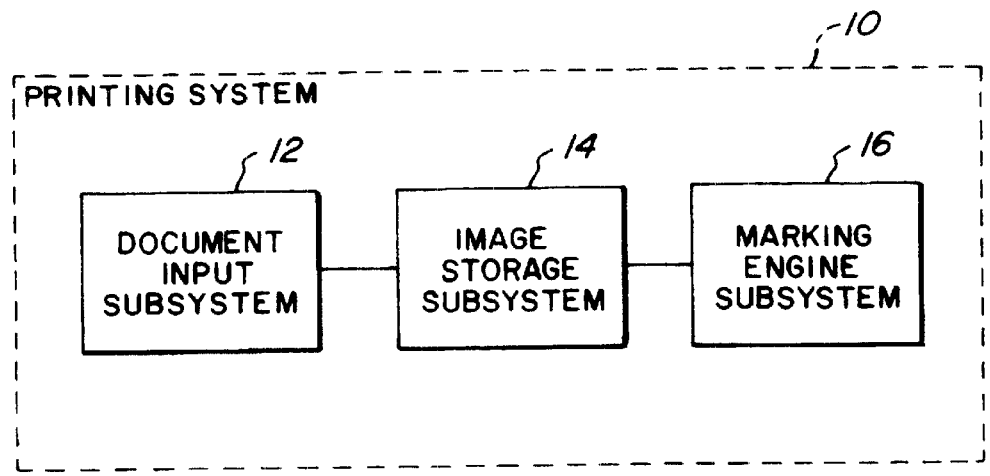
FIG. 1 shows the high-level architecture of the printing system according to the invention.

Referring to FIG. 1, the printing system 10 contains three primary subsystems. The document input subsystem 12 provides one or more devices for submitting documents to the printing system 10. Documents can be input through mechanisms such as a document scanner for copier operation or a raster image processor (RIP) capable of converting page description language into rasters for networked printer operation. An example of an input system is described in commonly assigned U.S. Pat. No. 5,808,747, issued Sep. 15, 1998, in the name of Telle. A scanner scans a document and converts the image information thereon to raster information or data that can be expressed as a digital signal. Once the raster image data has been acquired by the system, it is transferred to the image storage subsystem 14. When the document is ready to be printed, images are retrieved from the image storage subsystem 14 and sent to the marking engine subsystem 16. The marking engine subsystem 16 includes the mechanical and electrical components necessary to produce the physically marked pages of output. Examples of marking engines are electrophotographic devices, electrographic devices, thermal dye transfer devices, inkjet devices, photographic devices that record on a photographic member using an electro-optical exposure device or other spatial light modulator, magnetic recording devices, etc. Common to many of these various types of marking engine subsystems is the requirement that once a sheet of paper or film has been physically fed into the paper path or other path to be marked, the image data for that sheet must be delivered to the printhead at precisely the correct time. Otherwise, the sheet will be marked incorrectly. Consequently the image storage subsystem 14 and the marking engine subsystem 16 must be tightly coupled. In addition to the image data that is passed from the image storage subsystem 14 to the marking engine subsystem 16, timing and control information must also be communicated between the two subsystems.

Figure 2:
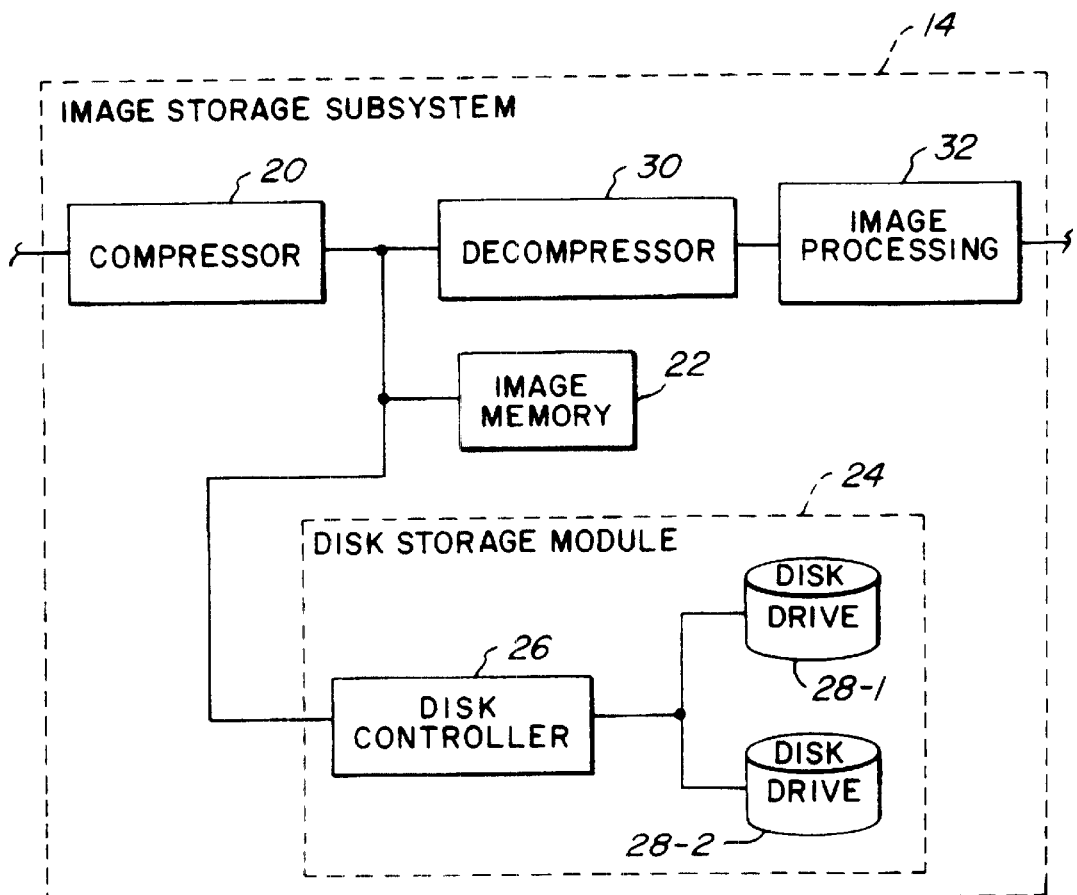
FIG. 2 shows the high-level image data path of the image storage subsystem according to the invention.

A general description of the internal image data path for the image storage subsystem 14 is shown in FIG. 2. Images are acquired by the document input subsystem 12 and then sent to the image storage subsystem 14 where they are compressed by the image compressor 20 using preferably a lossless image compression algorithm. The particular compression algorithm used is not significant to the invention, and algorithms such as Lempel-Ziv, Group 4 FAX, or other lossless compression algorithm can be used. A lossless compression algorithm is used so that the original input image is exactly reproduced when the image is decompressed. In accordance with the broader aspects of the invention, a "lossy" compression algorithm may be used. The compressed image data is then transferred to the image memory 22 which is DRAM semiconductor memory, typically using direct memory access (DMA) transfers. Other semiconductor memory may also be used such as synchronous DRAM (SDRAM) or static random access memory (SRAM). The image memory 22 serves as a temporary storage location for the compressed image data before it is transferred to the disk storage module 24. Storing the compressed data in the image memory 22 serves two purposes. First, it provides a location to place the compressed image data in the event that the disk storage module 24 is currently busy performing another data transfer. Second, it allows the complete image to be compressed before it is transferred to the disk storage module 24. This means that the size of the complete compressed image will be known before the compressed image data is written to the disk drives 28 in the disk storage module 24. This simplifies the allocation of storage space on the disk drives 28.

Once the compressed image data is in the image memory 22, it can be transferred to the disk storage module 24. The disk storage module 24 comprises at least one disk controller 26 and at least one disk drive 28. The disk controller 26 is typically an application specific integrated circuit that interfaces to one of the standard disk interfaces such as SCSI or IDE/ATA. The transfer from image memory 22 to the disk controller 26 is typically accomplished by a DMA engine contained within the disk controller 26. The transfer rate between the disk storage module 26 and the image memory 22 is an important factor in the overall performance of the image storage subsystem 14. Consequently, it may be desirable to increase the bandwidth within the disk storage module 24 by using multiple disk drives. For example, FIG. 2 shows a disk storage module configuration that utilizes one disk controller 26 to interface to two disk drives 28-1 and 28-2. However, the invention contemplates that bandwidth can generally be improved by using multiple disk drives and multiple disk controllers.

Once the compressed image data has been written into the disk storage module 24, the process of loading an image into the image storage subsystem 14 is complete. The compressed image data in the image memory 22 is no longer needed and that area of the image memory 22 can be overwritten to store another image.

When the marking engine subsystem 16 is ready to print an image, the image must first be retrieved from the disk storage module 24. As the compressed image data is read off of the disk drive(s) 28, the DMA engine in the disk controller 26 transfers the data to the image memory 22. Data coming off of the disk drives 28 does not necessarily flow continuously due to delays when the disk heads seek from one track to another. Once again the image memory 22 serves as a temporary buffer for the compressed image data. The advantage of this temporary buffer is that it decouples the disk storage module data transfers from the data transfers to the decompressor 30. The image memory 22 may be separate memory devices with one for storing image data to be transferred to the disk storage module 22 and the other for receiving image data from the disk storage module, collectively they are equivalent and comprise one memory device.

Once the compressed image data is located in image memory 22 and the marking engine subsystem 16 is ready to print the image, the decompressor 30 begins decompressing the image data. The compressed image data is typically transferred from the image memory 22 to the decompressor 30 using DMA accesses. The decompressor 30 uses the corresponding algorithm to that used by the compressor 20 to restore the image to its original content as received from the document input subsystem 12.

The decompressed image data is subsequently sent to the image processing block 32, where additional image processing operations can be performed. These operations include altering the image content, such as adding annotations. Other operations that may be performed here are the addition of white space for margins or shifting the image within the print frame. Additionally, resolution enhancement or printing process correction algorithms may be performed at this point. A correction algorithm and tables for correcting for nonuniformities of recording elements may also be provided, such as for correcting for nonuniformity of LEDs on an LED printhead. The resultant image is then transferred to the marking engine subsystem 16 where the data is used to appropriately mark the sheet being printed.

Figure 3:
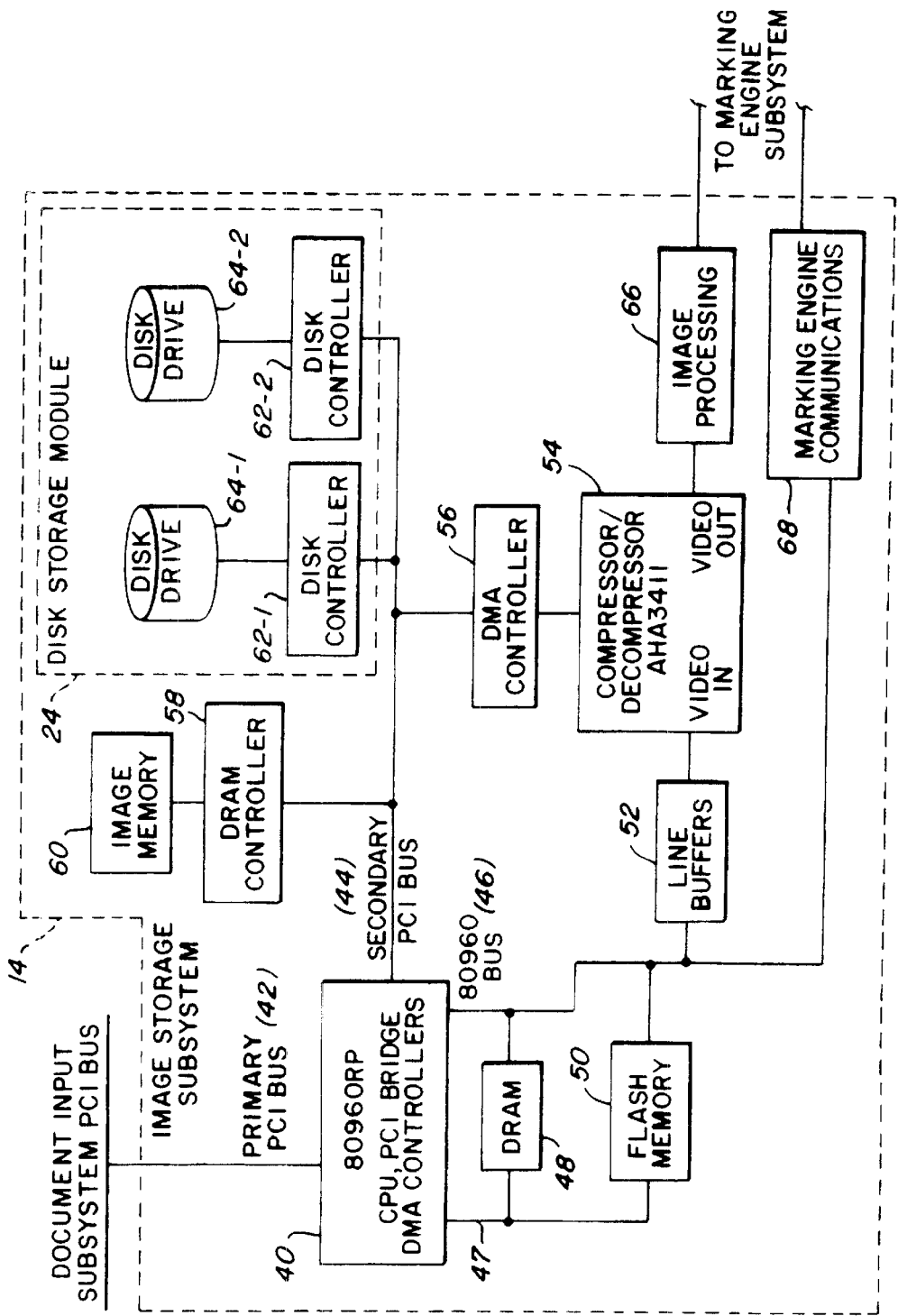
FIG. 3 shows a block-level diagram of the preferred embodiment of the image storage subsystem according to the invention.

FIG. 3 shows a preferred embodiment of the image storage subsystem 14. In the preferred embodiment, the interface between document input subsystem 12 and the image storage subsystem 14 is a primary PCI bus 42. Input images, whether rasterized by a RIP or acquired from a scanner are transferred over the PCI bus 42 into the image storage subsystem 14.

Figure 4:
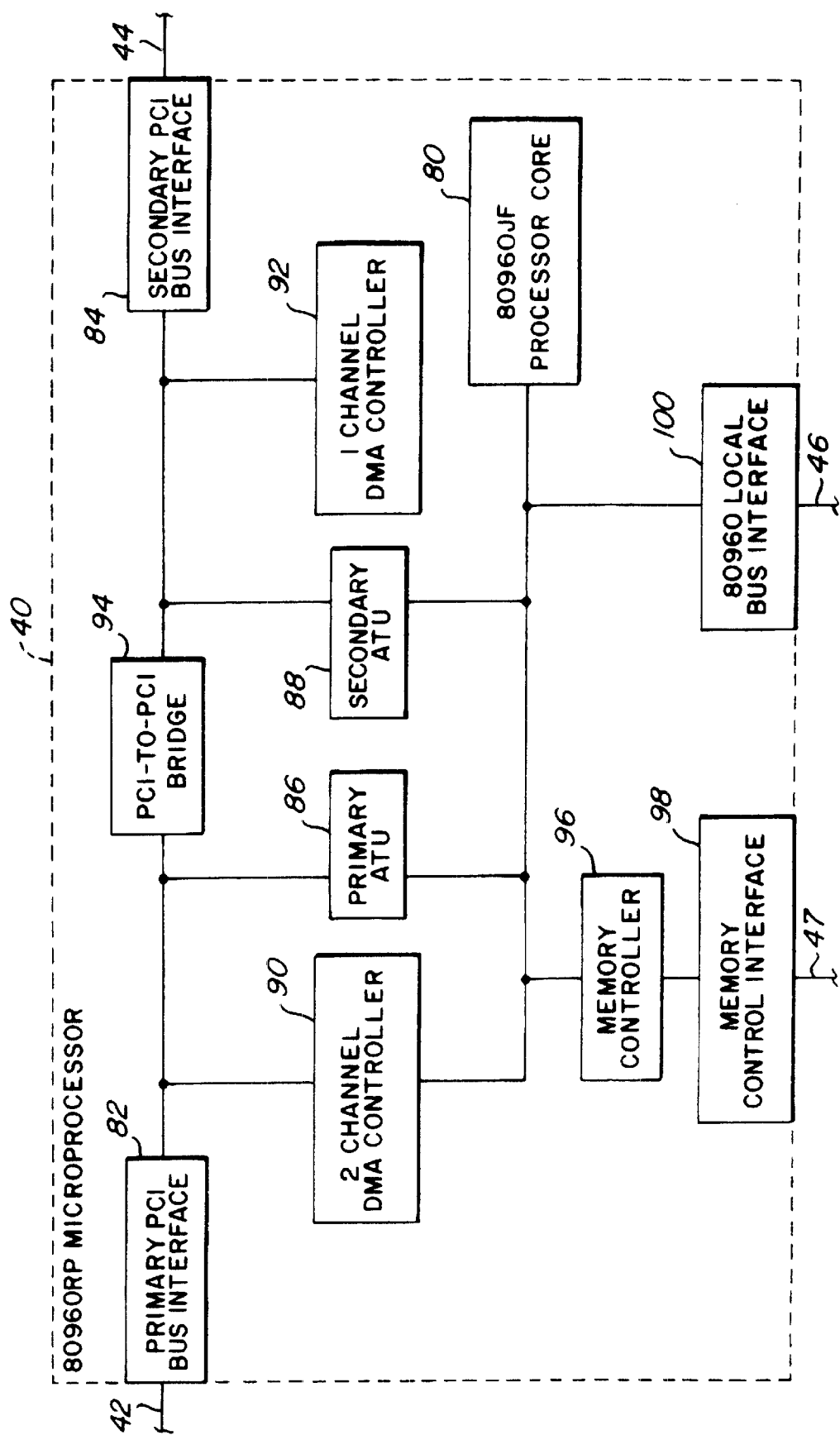
FIG. 4 shows the internal architecture of an Intel 80960RP microprocessor used in the preferred embodiment of the image storage subsystem of the invention.

The Intel 80960RP microprocessor 40 plays a central role in the functionality of the image storage subsystem 14. However, other microprocessors or computers may also be used. FIG. 4 shows the internal architecture of the Intel 80960RP microprocessor 40 which contains an 80960JF microprocessor core 80 integrated with a number of other peripheral devices. Chief among these are two PCI bus interfaces the primary PCI bus interface 82 and the secondary PCI bus interface 84, which the core microprocessor 80 can access through the address translation units (ATUs) 86 and 88. Additionally, there are internal DMA controllers 90 and 92 that can be used to move data between the PCI buses interfaces 82 and 84 and the 80960 local bus interface 100. The device also includes a PCI-to-PCI bridge 94 for moving data between the two PCI bus interfaces 82 and 84. Finally, the 80960RP microprocessor 40 includes a memory controller 96 which can be used through the memory controller interface 98 and memory control signals 47 to provide appropriate control to directly connect external DRAM 48 and flash memory 50 to the 80960 local bus 46.

In the preferred embodiment, the three external buses (42, 44, 46) of the 80960RP microprocessor 40 are used as follows: the primary PCI bus 42 interfaces to the document input subsystem, the secondary PCI bus 44 is used to move compressed image data within the image storage subsystem 14, and the 80960 local bus 46 is used for loading images, program execution, and interfacing to the communications interface 68 to the marking engine subsystem 16.

The flash memory 50 stores the program code executed by the microprocessor core 80. The DRAM 48 holds temporary variables, stack data,. and memory and disk allocation tables used by the program code in the operation of the image storage subsystem 14. The image storage subsystem does not require a software operating system such as a UNIX or other known sophisticated computer operating system.

The line buffers 52 hold lines of the image as it is transferred into the image storage subsystem 14 prior to being compressed. In the preferred embodiment, the image compressor 20 and image decompressor 30 are combined into a single device, the Advanced Hardware Architectures AHA3411 compressor/decompressor 54. The compressor/decompressor 54 has video input and output ports over which the uncompressed data moves. Compressed data is transferred by the external DMA controller 56 through the DRAM controller 58 into the DRAM image memory 60 which in a preferred application is 64 megabytes (MB).

In the preferred embodiment, the disk storage module 24 is implemented using two disk controllers 62-1, 62-2 each of which interfaces to a single disk drive 64-1, 64-2 respectively. The disk controllers 62-1, and 62-2 and disk drives 64-1 and 64-2 may use the industry standard IDE/ATA interface or other known interface.

Decompressed data moves from the compressor/decompressor 54 through the image processing block 66 to the marking engine subsystem 16. In the image processing block 66, the image is shifted to the proper location in the print frame, corrected to compensate for non-uniformities in the printing process, and formatted appropriately for transmission to the marking engine subsystem 16. An additional semiconductor memory for assembling complete pages such as signatures may be provided as part of the image processing block as taught in Telle. U.S. Pat. No. 5,808,747 or the assembled data for the signatures may be formed in the disk drives.

The marking engine communications block 68 implements a communications interface through which the image storage subsystem 14 communicates timing and control information with the marking engine subsystem 16. In the preferred embodiment this comprises an ARCnet interface for passing control messages and a timing bus for communicating timing information.

The operation of the image storage subsystem 14 is controlled by the microprocessor core 80. The microprocessor core 80 executes a program stored in the flash memory 50 which allows the image storage subsystem 14 to load images over the primary PCI bus interface 42 from the document input subsystem 12 and to retrieve images to be sent to the marking engine subsystem 16.

Images are loaded by programming the 80960RP DMA controller 90 to move the uncompressed image data from a location on the primary PCI bus 42 to the line buffers 52. The microprocessor core 80 also configures the compressor/decompressor 54 and the external DMA controller 56, as well as allocates space in the image memory 60 for the resultant compressed image data. As the 80960RP DMA controller 90 moves lines of the image into the line buffers 52, the data is transferred into the compressor/decompressor 54 where it is compressed and subsequently transferred by DMA accesses to the image memory 60. When the image compression is complete, the microprocessor core 80 receives interrupts from the 80960RP DMA controller 90, the compressor/decompressor 54 and the external DMA controller 56.

To move the compressed image data onto the disks of the disk drives 64-1, 64-2, the microprocessor core 80 first allocates storage space for the compressed image data. The microprocessor core 80 then programs DMA engines in the disk controllers 62-1, 62-2 to move the compressed image data from the image memory 60 to the disk drives 64-1, 64-2. When the transfer to the disks is complete, the microprocessor core 80 receives interrupts from the disk controllers 62-1, 62-2. These interrupts indicate that the disks are now ready for a next operation. The presence of multiple disk drives in the disk storage module 24 increases bandwidth of the disk storage module 24 because the bandwidth is limited by the time required to read and write information to a single disk. Where multiple disk drives are provided image data can be alternately read to the plural disks so that while data is stored in one disk controller and being written to one disk drive the next segment of data for the page can be stored in another disk controller for writing to its associated disk drive. The disk drive may be a mass storage device that records image data using magnetic recording or optical recording.

When the marking engine subsystem 16 is ready to print an image, a message is received by the marking engine communications interface 68 which causes an interrupt to the microprocessor core 80. The microprocessor core 80 determines the location on the disk drives 64 for the image requested, allocates space in the image memory 60 for the compressed image data, and programs the DMA engines in the disk controllers 62 to move the compressed image data from the disk drives 64-1, 64-2 to the image memory 60. When the transfer from the disk drives 64-1, 64-2 to the image memory 60 is complete, the microprocessor core 80 receives interrupts from the disk controllers 62-1, 62-2.

When the appropriate timing signals are received from the marking engine subsystem 16 via the marking engine communications interface 68 indicating that the marking engine is ready to print the image, the microprocessor core 80 receives an interrupt and configures the DMA controller 56 and decompressor within the compress or/decompressor 54 to transfer the compressed image data from the image memory 60 to the compressor/decompressor 54, decompress it, and send it to the image processing block 66. The microprocessor core 80 also configures the image processing block 66 to perform any required image manipulations such as shifting the image and performing non-uniformity compensation. The resultant image is then transferred to the marking engine subsystem 16 where it is printed. The microprocessor core 80 receives interrupts from the compressor/decompressor 54 and the image processing block 66 when the image transfer is complete.

Disk Bandwidth and Image Compression

To maintain maximum productivity of the marking engine subsystem 16, and hence the entire printing system 10, the image storage subsystem 14 must be able to transfer any image to the marking engine subsystem 16 whenever it is requested. To do this, the bandwidth of the disk storage module 24 must be sufficient to retrieve any image from the disk drives 28 in the time that it takes to print that image. The image storage subsystem 14 can then operate in a pipelined mode in which one image is transferred from the semiconductor image memory 22 to the decompressor 30, decompressed, and sent to the marking engine subsystem 16 while the next image to be printed is being transferred from the disk storage module 24 to the image memory 22. This mode of operation allows the image storage subsystem 14 to continuously deliver any stream of images to the marking engine subsystem 16, thereby allowing the marking engine subsystem 16 to run at full speed.

The compression algorithm used in the compressor 20 impacts the bandwidth required for the disk storage module 24. Lossless compression algorithms typically compress images by a ratio of at least 2:1, and compression ratios of 10:1 are not uncommon. However, certain images (lacking any patterns distinguishable by the compression algorithm) will not compress well. The compressor 20 may recognize such images and pass them through unchanged, or may even expand the images in the process of trying to compress them. If the algorithm used by the compressor 20 can expand the images, then the bandwidth of disk storage module 24 must be provided to take into account the largest (worst-case) compressed image size. Bandwidth may be increased by providing modules with faster read, write or access times or by providing additional disk drives and drive controllers in the disk storage module.

When worst-case compressed images are being retrieved from an image storage subsystem 14 containing a disk storage module 24 with this minimum data transfer bandwidth, the entire bandwidth of the disk storage module 24 is consumed with transferring data from the disk drives 28 to the image memory 22 in preparation for printing the images. In this case, there is no disk bandwidth available to place incoming images that have just been compressed on the disk drives 28. However, worst-case compressed images are the exception, rather than the norm. Generally, images will compress by at least 2:1, which means that less than half of the bandwidth of the disk storage module 24 will be used for retrieving images to be printed. The remaining disk bandwidth can then be made available to load incoming images into the disk storage module 24. Once again, since most images will compress by at least 2:1, the bandwidth needed for loading images into the disk storage module 24 will generally be less than the available bandwidth. Thus, in the typical case, the image storage subsystem 14 will be able to simultaneously load and retrieve images at the speed the marking engine subsystem 16 prints them. In the worst case, the image storage subsystem 14 will only retrieve images at the speed the marking engine subsystem 16 prints them.

In the preferred embodiment, the marking engine subsystem 16 can print 600 dots per inch (DPI) 8.5 inch by 14 inch images at 110 images per minute. Consequently, the maximum sustained speed at which decompressed images must be transferred to the marking engine subsystem 16 is 9.8 megabytes per second (MB/s). Since the compressor/decompressor 54 uses an algorithm that expands worst-case images by a ratio of 8:9, the disk storage module 24 must be capable of sustaining a transfer rate of 11.0 MB/s. With a disk storage module 24 capable of sustained transfers at that rate, the image storage subsystem 14 will always be able to transfer images to the marking engine subsystem 16 when requested.

In the preferred embodiment the image memory 60 of 64 MB is sufficient to store in compressed form (worst case) seven images of 11 inch×17 inch size. The memory 60 may be operated so that up to three 11 inch×17 inch pages are reserved for storing pages to be input to the disk storage module and up to four 11 inch×17 inch pages are reserved for storing output from the disk storage module.

It will be noted that the secondary PCI bus 44 carries compressed rasterized image data only. The compressed image data is carried on this bus from the compressor 54 to the image memory 60, from the image memory 60 to the disk storage module 24, from the disk storage module 24 to the image memory 60 and form the image memory 60 to the decompressor 54. Where bandwidth considerations permit the process of moving image data may be such that a segment of data is moved from disk storage module 24 to image memory 60 and then is followed by a segment of data of a different page that is moved from image memory 60 to the compressor 54. Thus data of small segments of different pages are moved successively between the image memory, the disk storage module 24 and the compressor/decompressor 54. Expanded or uncompressed image data appears only on the primary PCI bus 42, the local bus 46 and the video input and video output lines of compressor/decompressor 54. The presence of only compressed data on the secondary PCI bus 44 conserves bandwidth on the bus 44 since most pages will compress efficiently. Image memory 60 is preferably of the type where image data can be written to read therefrom substantially simultaneously or at least alternatively with each clock cycle.

It is preferred that the number of disk drives provided in the disk storage module be such as to always be able to transfer decompressed images to the printer when requested regardless of how well the images were compressed. As noted in the cross-referenced application, this number can be determined from the following formula:

$$N=(S*R*C)/(D*60)$$

wherein N is the number of disk drives rounded up to the next largest integer and typically for high speed, high resolution printers N will be two or more disk drives;

S is the image size (uncompressed) in megabytes of a given page size; and

R is the printing page rate in pages per minute for the page of the given page size.

Because the printer may have different requirements for printing pages of different size papers and thus different products of S*R, the product S*R in the above formula is the worst-case product (resulting in the highest value of N).

C is the worst case compression ratio of the compressor; and

D is the sustained disk bandwidth (megabytes per second) of a disk drive in the disk storage module. Typically, sustained bandwidth is assumed to be the bandwidth achieved when transferring data from the disk to memory, where the amount of data transferred is at least four times the size of the internal cache RAM on the disk drive.

In the case where worst case compressed images are being retrieved from the disk drives or there are fewer disk drives provided than are optimum, a method can be provided to ensure that image retrievals from the disk storage module 24 have priority over loading incoming images into the disk storage module. If priority is not given to the image retrieval operations, then the image storage subsystem 14 may not be able to supply images to the marking engine subsystem 16 when they are needed, resulting in reduced output performance of the printing system 10.

In the preferred embodiment, the control of accesses to the disk storage module 24 to give priority to image retrieval is done through the control program executing on the microprocessor core 80. The control program has a control loop through which it repeatedly passes checking for tasks that need to be executed. Examples of tasks initiated by the control loop are: processing messages from the marking engine communications interface 68, compressing incoming images, storing incoming compressed images in the disk storage module 24, retrieving images to be printed from the disk storage module, and decompressing and sending images through the image processing block 66 to the marking engine subsystem 16.

Transfers from the disk storage module 24 to the image memory 22 (for retrieving images) are initiated by the control program as soon as the request for the image is received from the marking engine subsystem 16 and the disk storage module is available to start a new transfer. Transfers from the image memory 22 to the disk storage module 24 (for loading images) are initiated by the control program when there is an image ready to be stored, the disk storage module is ready to start a new transfer, and there is no pending request to retrieve an image from the disk storage module. Therefore, an image load operation to the disk storage module 24 cannot begin if there is an image retrieval operation in progress or waiting to begin.

To further improve the arbitration of accesses to the disk storage module 24, the transfers between the image memory 22 and the disk storage module 24 are divided into segments that can be completed fairly quickly. In the preferred embodiment, the segments are 256 kilobytes (kB) each and generally take less than 20 milliseconds. This is less than 4% of the page time in the preferred embodiment in which the marking engine subsystem 16 prints at 110 pages per minute. The size of the segments impacts both the transfer rate to the disk storage module 24 and the latency for responding to image retrieval requests. It is anticipated that larger or smaller segments may be used, depending on the performance of the disk storage module 24 and the marking engine subsystem 16. At the completion of each of these disk transfers, the control loop rechecks for pending image load and retrieve requests and gives priority to the image retrieve operation. Thus, if an image store is started and an image retrieval request is received shortly thereafter, the image retrieval operation will be started within 20 milliseconds of being received (when the image storage operation completes).

Generally, it is preferred to limit write transfers; i.e., transfers to store data on the disk, according to the following relationship:

$$S_{WT}=(B*t)-I$$

$S_{WT}$=Maximum size of write transfer to store data on disk in megabytes (MB);
  I=Maximum compressed image size in MB for recording an image frame.
  t=Time for recording an image frame.
  B=Sustained bandwidth of the disk storage module in MB/second.

Typically, sustained bandwidth is assumed to be the bandwidth achieved when transferring data from the disk to memory, where the amount of data transferred is at least four times the size of the internal cache RAM on the disk drive.

Because the printer may have different requirements for printing pages of different size papers and thus different combinations of I and t, the combination of I and t in the above formula should be the worst case (resulting in the lowest value of $S_{WT}$). Also as a further general rule, $S_{WT}$ should not exceed 10% of the product of B*t.

As an example, of a preferred embodiment, I=6.4 MB; t=0.545 seconds (110 pages per minute); B=12.6 MB/second. This provides a maximum write transfer size of 0.467 MB which can be accommodated in 37 milliseconds. In the preferred embodiment, the actual transfer size used is 0.250 MB due to limitations in the disk drive in the amount of data that can be written in one command.

Figure 5:
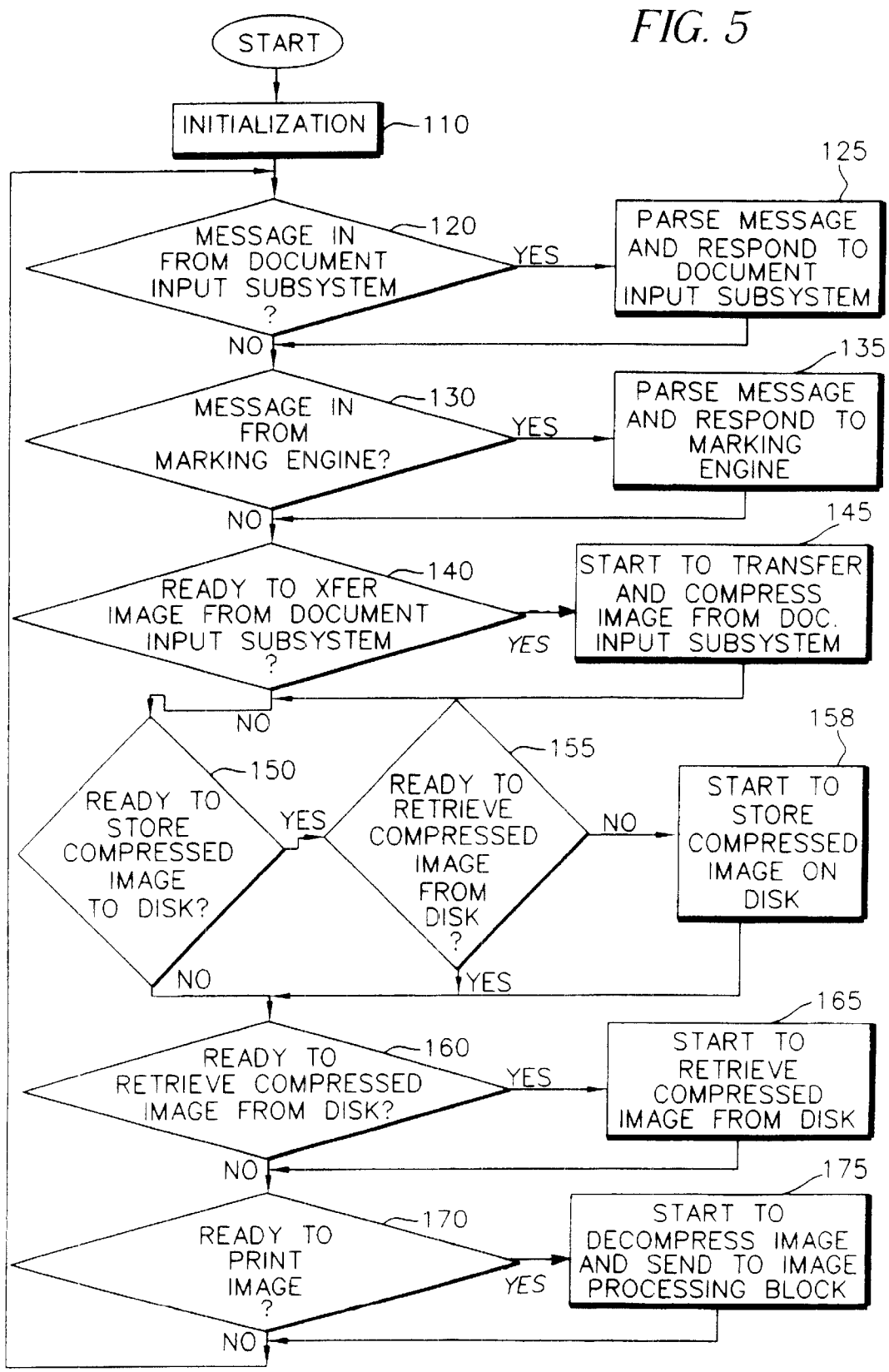
FIG. 5 is a flowchart illustrating operation of the method of the invention.

With reference to flowchart 100 of FIG. 5, there is illustrated a control program operation for establishing a prioritization scheme for controlling read and writes to the disk storage module 24. A computer program for implementing this prioritization scheme may be provided in the flash memory 50 and is implemented by microprocessor 40 through control of the various controllers.

In step 110, there is an initialization routine wherein various hardware components are initialized, entries in an image table in DRAM memory 48 are zeroed out. The image table is used to indicate what images are being stored in the ISS. Also, initialized are queues maintained for messages and queues for storing and receiving images. Thus, the components of the system are generally placed in a known beginning state.

In step 120, a determination is made as to whether or not a message has been received from the document input subsystem (DIS). Messages from the DIS may include for example an image transfer request, or a request for a health check or a diagnostic check.

If a message has been received in step 125, the message is parsed and a response provided to the DIS. No response may be provided to an image transfer request at this time. A health check or diagnostic check may be responded to. Typically, the DIS includes a controller that is programmed to generate messages and interpret and act upon responses from the image storage subsystem (ISS).

If no message is provided by the DIS to the ISS or a message was received and was responded to, the program steps to step 130 wherein a determination is made as to whether or not a message has been received from the marking engine subsystem (MES). Messages from the MES may include a print image request (request to download image from memory 22 or 60), delete image (remove from ISS after printing of the image) or set uniformity correction logic for image processing block 66. The MES typically includes a controller that is programmed to generate messages and to act upon responses from the ISS. If the answer is yes, the message is parsed and a response is provided to the ME (Step 135). Such responses may be an acknowledgement and are not necessarily acted upon. Assuming a message from the MES was received and responded to or no message was received, the process steps to step 140. In step 140, a determination is made as to whether or not the ISS is ready to transfer image data from the DIS. If the answer is yes, image information from the DIS is allowed to be transferred and compressed and stored in DRAM image memory 22 (FIG. 2) or 60 (FIG. 3), step 145. With the start of transfer of a page of image information from the DIS the DMA controllers may take over the control of transfer and compression of the remainder of the page.

After start of transfer and compression of image data from the DIS and storage in DRAM memory 22 or 60 has occurred or in the event that no image data is to be transferred from the DIS a determination is made as to whether or not the DRAM memory and disk memory 24 are ready to store compressed image data to disk, step 150. If the answer to step 150 is yes, a further determination is made as to whether or not the DRAM memory and disk memory are ready to retrieve compressed image data from the disk memory for storage into the DRAM memory, step 155. If the answer to step 155 is no (for example, no requests from MES), the compressed image data in DRAM memory is written to the disk memory for storage thereon, step 158. The maximum amount written is no more than the maximum size $S_{WT}$ described above. If the answer to step 155 is yes or the answer to step 150 is no, the process steps to step 160 wherein a determination is again made as to whether or not the DRAM memory and disk memory are ready to retrieve compressed image data from disk for storage in the DRAM memory. If the answer to step 160 is yes, the compressed image data is retrieved from the disk memory and stored in the DRAM memory, step 165. If the answer is no in step 160 or the data has been retrieved in step 165, the process steps to step 170 wherein a determination is made as to whether or not a message from the marking engine subsystem (MES) has been received indicating readiness to print an image or at least to transfer an image to the MES for image processing. If the answer to step 170 is yes, the compressed image data for the page to be sent to the MES is output from the DRAM memory and is then decompressed and sent to the image processing block of the MES, step 175. If the answer to step 170 is no or after processing an image in step 175, the process returns to step 120.

It is anticipated that other approaches for giving priority to retrieving images over loading images in the disk memory may be used. For example, image requests from the marking engine subsystem 16 may be received at a regular periodic rate that corresponds to the printing speed of the marking engine subsystem 16. Therefore, if the time at which the last image request was received is known, it would be possible to predict when the next image request might arrive. Image loading operations could then be constrained to only store as much of the data as can be transferred to the disk storage module 24 before the next image retrieval request is expected. This approach would ensure that the disk storage module 24 would always be available whenever an image retrieval request might be expected.

Figure 6A:
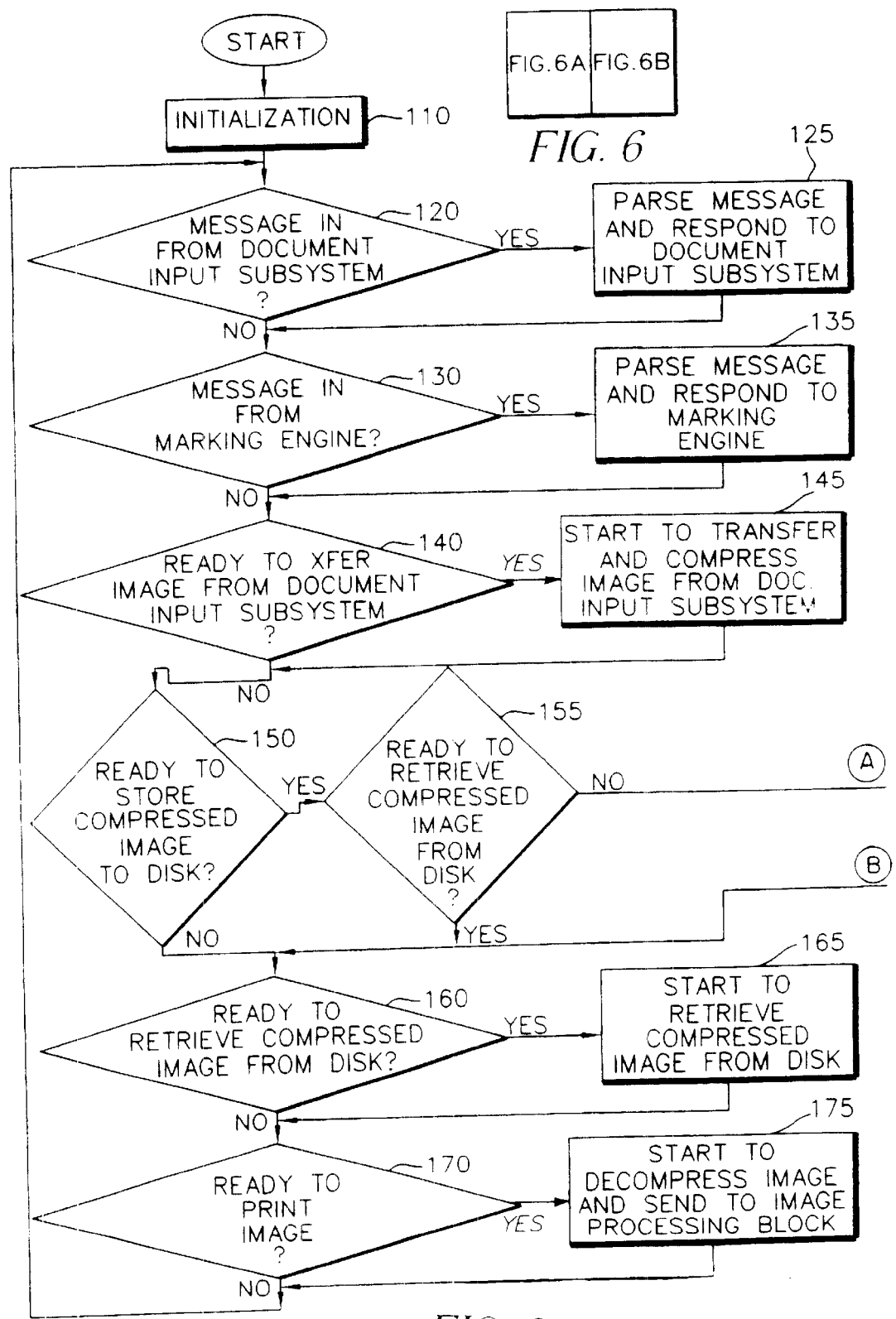
FIG. 6a is a flowchart illustrating an alternative method of the invention.
Figure 6B:
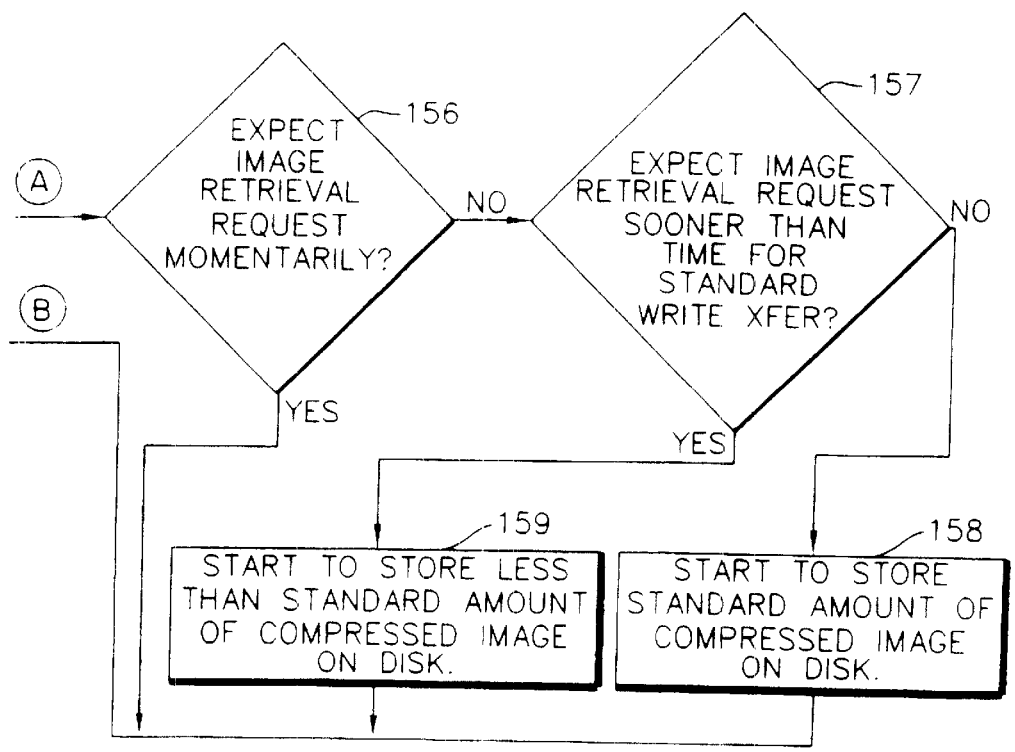

In this regard, reference may be had to the flowchart of FIG. 6a wherein like numbers refer to similar steps described for the flowchart of FIG. 5. In FIG. 6b, decision blocks 156, 157 and action block 159 are added to the flowchart of FIG. 5. In step 156 after a decision is made that the disk storage module is ready to store compressed image to disk but not ready to retrieve compressed image from the disk (for example no request by MES) a decision is made as to whether or not an image retrieval request is expected momentarily. This expectation may be based on timing prior retrieval requests and noting an expected pattern of such requests so that the time at which a next expected retrieval request is expected can be predetermined. The control program may be programmed to determine this expected time based on previous requests and programmed with a preset period to distinguish between times when the expected time is considered only a very short duration (or "momentarily") away from the expected time or the expected time is longer than the momentarily away period. In step 156, if the answer is no, then there is sufficient time to begin writing of at least some compressed image data to disk. In such case, a determination is made in step 157 as to whether or not the expected image retrieval request is expected to occur sooner than the time it would take for a "standard" write transfer to the disk storage module. As noted above, write transfers are to be limited to the maximum size $S_{WT}$ which can be accommodated and in a worst case in this example is no more than 37 milliseconds. If the determination made in step 157 is no and thus more than 37 milliseconds is available before the next retrieval request, then the process steps to step 158 and a write operation to disk is commenced to write compressed image data from DRAM image memory 60 This write transfer is limited to a maximum predetermined size $S_{WT}$ which is the standard or normal maximum transfer size. If the determination is yes in step 157, the microprocessor 40 then determines an amount of compressed image data that is less than the standard size which can be written before the next expected retrieval request and controls the transfer of compressed image data in the DRAM image memory 60 to the disk storage module 24 so that a less than standard amount of compressed image data is transferred to the disk storage module, step 159 This allows for completion of this write transfer preferably just prior to the time of the next expected image retrieval request which is examined for in step 160. The process illustrated by FIGS. 6a and 6b is otherwise similar to that described for the flowchart of FIG. 5. It will be understood that the time periods needed for writing to or retrieving compressed image data from disk are significantly greater than the times needed to render a decision or parse a message.

There is thus provided an improved method and apparatus for providing image data to a marking engine subsystem or IOT wherein storage of the image data in compressed form is provided in a mass memory such as a disk drive. There is no need for complex software management to determine whether or not image data should by-pass the storage in the disk drive, yet there is sufficient bandwidth and preferential access provided to the mass memory to enable image data to be retrieved from the mass memory as needed in response to or in anticipation of requirements of the marking engine subsystem.

The invention has been described in detail with particular reference to certain preferred embodiments thereof, but it will be understood that variations and modifications can be effected within the spirit and scope of the invention.

What is claimed is:

1. A printer apparatus comprising:
    a marking engine subsystem for recording information on an image recording member and
    an image storage subsystem for buffering image data for output to the marking engine subsystem, the image storage subsystem including:
    (a) an input for receiving rasterized image data;
    (b) a data compressor that operates on the rasterized image data to compress the rasterized image data to form compressed image data;
    (c) a disk storage module that is operable to receive, store and output the compressed image data;
    (d) a semiconductor RAM memory device that stores at least one page of the compressed image data;
    (e) a data decompressor that operates on the compressed image data output by the RAM memory device and decompresses the compressed image data to decompressed rasterized image data form for output to the marking engine subsystem; and
    (f) a controller that determines if the disk storage module is ready to operate in a write mode to receive compressed image data currently being stored in the RAM memory device and determines if the disk storage module is ready to operate in a read mode to output compressed image data from the disk storage module for transfer to the RAM memory device and, if the disk storage module is ready to operate in both modes, the controller is operative to provide a preference for operation of the read mode and controls the disk storage module so that compressed image data is output from the disk storage module and written into the RAM memory device.

2. The apparatus of claim 1 wherein the controller controls operation of the write mode of transfers of compressed image data from the RAM memory device to the disk storage module so that transfers of compressed image data to the disk storage module are limited to no more than a portion of the image data of a page before permitting operation of the read mode.

3. The apparatus of claim 2 wherein the input for receiving rasterized image data includes a first input bus, the RAM memory device is connected to a second bus, the compressor and decompressor are connected to the second bus, and the disk storage module is connected to the second bus for moving compressed image data from the compressor to the RAM memory device, from the RAM memory device to the disk storage module and from the RAM memory device to the decompressor so that as to image data, only image data that is compressed is provided on the second bus.

4. The apparatus of claim 3 wherein decompressed image data is output from the decompressor on a third bus.

5. The apparatus of claim 1 wherein the controller controls operation of the write mode so that transfers of compressed image data to the disk storage module are limited to no more than 10% of the product of the sustained bandwidth of the disk storage module in megabytes per second and a time in seconds for recording an image frame by the marking engine subsystem before permitting operation of a read mode.

6. The apparatus of claim 5 wherein the input for receiving rasterized image data includes a first input bus, the RAM memory device is connected to a second bus, the compressor and decompressor are connected to the second bus, and the disk storage module is connected to the second bus for moving compressed image data from the compressor to the RAM memory device, from the RAM memory device to the disk storage module and from the RAM memory device to the decompressor so that only compressed image data is provided on the second bus.

7. The apparatus of claim 6 wherein decompressed image data is output from the decompressor on a third bus.

8. The apparatus of claim 1 wherein the controller controls operation of the write mode so that transfers of compressed image data to the disk storage module are limited to no more than a size $S_{WT}$ before permitting operation of a read mode;

wherein $S_{WT}=(B*t)-I$;

wherein $S_{WT}$ is the maximum size of a write transfer to store data on the disk storage module in megabytes;

B is the sustained bandwidth of the disk storage module in megabytes per second;

I is the maximum compressed image size in megabytes for an image frame; and t is the time in seconds for recording the image frame by the apparatus.

9. In a printer apparatus that includes a marking engine subsystem for recording information on an image recording member, an image storage subsystem for buffering image data for output to the marking engine subsystem, the image storage subsystem comprising:

a disk storage module that is operable to receive, store and output image data; and a controller that determines if the disk storage module is ready to operate in a write mode to receive image data and determines if the disk storage module is ready to operate in a read mode to output image data from the disk storage module, and if the disk storage module is ready to operate in both modes, the controller is operative to provide a preference to the read mode and image data is output from the disk storage for subsequent output to the marking engine subsystem; and wherein the controller controls operation of the write mode so that transfers of compressed image data to the disk storage module are limited to no more than a portion of the image data of a page before permitting operation of the read mode.

10. The image storage subsystem of claim 9 wherein the controller controls operation of the write mode so that transfers of compressed image data to the disk storage module are limited to no more than 10% of the product of the sustained bandwidth of the disk storage module in megabytes per second and a frame time in seconds for recording an image frame by the marking engine subsystem before permitting operation of a read mode.

11. The image storage subsystem of claim 9 wherein the controller controls operation of the write mode so that transfers of compressed image data to the disk storage module are limited to no more than a size $S_{WT}$ before permitting operation of a read mode;

wherein $S_{WT}=(B*t)-I$;

wherein $S_{WT}$ is the maximum size of a write transfer to store data on the disk storage module in megabytes;

B is the sustained bandwidth of the disk storage module in megabytes per second;

I is the maximum compressed image size in megabytes for recording an image frame; and t is the time in seconds for recording the image frame by the apparatus.

12. The image storage subsystem of claim 9 wherein the disk storage module is connected to a bus so that image data may be transferred to the disk storage module via the bus and may be transferred from the disk storage module via the bus.

13. A method of managing movement and storage of image data to and from a mass memory device in a printer apparatus, the method comprising:

determining if the mass memory device is ready to operate in a write mode to receive image data;

determining if the mass memory device is ready to operate in a read mode to output image data stored in the mass memory device; and if the mass memory device is ready to operate in both modes:

a) providing preference for operation in the read mode, and b) outputting from the mass memory device image data stored in the mass memory device; and c) controlling an operation of the write mode so that transfers of image data to the mass memory device are limited to no more than a portion of the image data of a page.

14. The method of claim 13 wherein image data is transferred to and output from the mass memory device via the same bus.

15. The method of claim 14 wherein the image data is transferred to a RAM memory device via the bus and the RAM memory device outputs image data to the mass memory device, which is a disk storage module, via the bus.

16. The method of claim 15 wherein the RAM memory device has access to the bus for transfer of image data to and from the mass memory device and image data transferred on the bus is compressed rasterized image data.

17. The method of claim 16 wherein transfers of imaged data to the disk storage module are limited to no more than 10% of the product of the sustained bandwidth of the disk storage module in megabytes per second and a time in seconds for recording an image frame for the apparatus before permitting operation of the read mode.

18. The method of claim 16 wherein transfers of compressed image data to the disk storage module are limited to no more than a size $S_{WT}$ before permitting operation of a read mode;

wherein $S_{WT}=(B*t)-I$;

wherein $S_{WT}$ is the maximum size of a write transfer to store data on the disk storage module in megabytes;

B is the sustained bandwidth of the disk storage module in megabytes per second;

I is the maximum compressed image size in megabytes for an image frame; and t is the time in seconds for recording an image frame by the apparatus.

19. A method of managing movement of image data in a printer apparatus comprising:

(a) inputting rasterized image data to an image storage subsystem of the apparatus;

(b) compressing the rasterized image data to compress the rasterized image data to form compressed image data;

(c) storing at least one page of the compressed data in a semiconductor RAM memory device;

(d) outputting the compressed data from the RAM memory device to a disk storage module;

(e) outputting the compressed image data from the disk storage module to the RAM memory device;

(f) outputting the compressed image data from the RAM memory device that was previously stored in the disk storage device to a data decompressor;

(g) decompressing the compressed image data to decompressed rasterized image data form; and (h) determining if the disk storage module is ready to operate in a write mode to receive transfers of compressed image data currently being stored in the RAM memory device and determining if the disk storage module is ready to operate in a read mode to output compressed image data from the disk storage module for transfer to the RAM memory device and, if the disk storage module is ready to operate in both modes, preference is provided for operation in the read mode and compressed image data is output from the disk storage module and written into the RAM memory device.

20. The method of claim 19 wherein transfers of compressed image data to the disk storage module are limited to no more than a portion of the image data of a page before permitting operation of the read mode.

21. The method of claim 20 and wherein an amount of compressed image data that is transferred to the disk storage module in a write mode is determined according to a time remaining until a next expected image retrieval request.

22. The method of claim 13 and wherein an amount of compressed image data that is transferred to the disk storage module in a write mode is determined according to a time remaining until a next expected image retrieval request.

23. A method of managing movement and storage of image data to and from a mass memory device in a printer apparatus, the method comprising:

determining when a next retrieval request is expected for transferring image data from the mass memory device in a read mode;

responding to the determining step to organize transfers of image data in a write mode to transfer a normal amount of image data if the next retrieval request is determined to be greater than a predetermined amount and to transfer less than the normal amount if the next retrieval request is determined to be less than the predetermined amount; and controlling transfers of image data to the mass memory device so that in a write mode, the transfers are limited to no more than a portion of the image data of a page and the amount of image data transferred in the write mode is related to time remaining until the next expected retrieval request.

24. The method of claim 23 herein the mass memory device is a disk storage module and wherein transfers of compressed image data to the disk storage module are limited to no more than a size $S_{WT}$ before permitting operation of a read mode;

wherein $S_{WT}=(B*t)-I$;

wherein $S_{WT}$ is the maximum size of a write transfer to store data on the disk storage module in megabytes;

B is the sustained bandwidth of the disk storage module in megabytes per second;

I is the maximum compressed image size in megabytes for an image frame; and t is the time in seconds for recording an image frame by the apparatus.

* * * * *